United States Patent [19]

Arndt et al.

[11] Patent Number: 4,521,567

[45] Date of Patent: Jun. 4, 1985

[54] METHOD FOR MAKING IMPACT RESISTANT MOLDING COMPOSITIONS

[75] Inventors: Peter J. Arndt, Seeheim-Jugenheim; Walter Ludwig, Bensheim-Auerbach; Manfred Munzer, Bensheim; Werner Siol; Franz Wenzel, both of Darmstadt, all of Fed. Rep. of Germany

[73] Assignee: Röhm GmbH, Darmstadt, Fed. Rep. of Germany

[21] Appl. No.: 637,863

[22] Filed: Aug. 6, 1984

[30] Foreign Application Priority Data

Aug. 18, 1983 [DE] Fed. Rep. of Germany ....... 3329765

[51] Int. Cl.$^3$ .................... C08L 51/00; C08F 265/04; C08F 265/06
[52] U.S. Cl. .................................. 525/261; 525/267; 525/273; 525/304; 525/305; 525/308; 525/309; 525/902
[58] Field of Search ............... 525/261, 267, 273, 304, 525/305, 309

[56] References Cited

U.S. PATENT DOCUMENTS 3,458,603 7/1969 Griffin ................................ 260/881
3,711,576 1/1973 Hwa ................................... 260/899
3,943,190 3/1976 Abe et al. ............................ 260/876

OTHER PUBLICATIONS

Abstract–Japanese Pat. Nos. 53138-496, 53036-589, Kuraray.

*Primary Examiner*—Carman J. Seccuro
*Attorney, Agent, or Firm*—Curtis, Morris & Safford

[57] ABSTRACT

A method for making impact resistant molding compositions wherein a hard phase having a glass transition temperature above 25° C. and consisting principally of methyl methacrylate is polymerized at least partially in a first stage, following which the monomers of a rubbery phase whose polymers have a glass transition temperature below 25° C. are added in a second stage and the polymerization is carried to completion, polymerization of the hard phase in the first stage being performed in a presence of an oil soluble free radical initiator and of an organosulfur chain transfer agent having at least two thiol groups in the molecule, and polymerization of the monomers of the rubbery phase in the second stage being carried out with graft crosslinkers in the presence of the previously formed hard phase.

21 Claims, No Drawings

METHOD FOR MAKING IMPACT RESISTANT MOLDING COMPOSITIONS

The present invention relates to a method for making impact resistant molding compositions, and particularly of crystal clear molding compositions, by means of a two stage polymerization process.

Polymers modified to improve their impact strength generally are multiphase materials comprising at least a hard phase and a rubbery phase. Such polymers are produced commercially mainly by emulsion polymerization since discrete rubbery phase particles coated with a hard phase can readily be produced by this method. However, the advantages inherent in this method (selective buildup of the latex from the inside out, etc.) are partly offset by the considerable difficulties and costs which isolation of the solid polymer entails. Moreover, the polymerization auxiliaries used cannot always be removed to the desired extent. It has therefore been sought to produce impact resistant molding compositions by methods other than emulsion polymerization, for example by bulk or bead (suspension) polymerization.

As is known, in the bead polymerization insoluble monomers (the disperse phase) are dispersed by mechanical action (agitation) in a nonsolvent (the continuous phase) and polymerized, generally by the use of initiators insoluble in the continuous phase. The polymer formed is predominantly soluble in the monomer. Under the influence of interfacial tension, the monomer forms spherical droplets. To preserve their globular shape during polymerization and to prevent the droplets from coalescing, so-called dispersing agents (protective colloids) are added to the polymerization recipe. These are preferably substances which on completion of polymerization can be separated completely from the polymer, which is obtained in bead form.

The continuous phase usually is water. A method for making impact resistant bead polymers is described in U.S. Pat. No. 3,458,603. In that multiple stage process, the bead polymerization of methyl methacrylate and/or styrene is carried out in a first stage in the presence of dispersing agents and with the formation of a first aqueous dispersion. Bead polymerization is then continued in this first dispersion in a second stage with a monomer mixture of $C_1$ to $C_8$ alkyl acrylates together with from 0.01 to 10 weight percent of a crosslinking agent, with formation of a second aqueous dispersion. Bead polymerization is then completed in this second dispersion in a third stage after the addition of methyl methacrylate and/or styrene. In each stage, the monomers may contain up to 50 weight percent of another copolymerizable monomer. Each process stage should be carried to complete polymerization of the monomers present. The molecular weight of the polymers may be controlled conventionally.

U.S. Pat. No. 3,943,190 also proposes impact resistant bead polymers which are produced by a two stage process. The hard phase, consisting of methyl methacrylate with from 0 to 40 weight percent of a $C_1$ to $C_8$ acrylic ester and from 0 to 10 weight percent of a vinyl monomer copolymerizable with said ester, is polymerized in the first stage and the soft phase, formed from 89 to 99.9 weight percent of alkyl acrylate, from 0.1 to 3 weight percent of crosslinking agent, and optional alkyl methacrylate, is polymerized in the second stage. The weight ratio of the monomers polymerized in the first stage to the monomers polymerized in the second stage must be 100:20–70.

According to Japanese patent publication No. 80-03423 (Chem. Abstr. 92, 199258t), transparent, weather resistant, and impact resistant polymers are obtained by multiple stage suspension polymerization. Here, too, the hard phase, consisting of 50 to 100 weight percent of methyl methacrylate, is polymerized first. Then a mixture of an acrylic ester, from 0 to 10 weight percent of alkyl methacrylate, from 0.1 to 3 weight percent of crosslinking agent, and from 1 to 30 weight percent of a comonomer for matching the refractive index to that of the hard phase is added and the particles of the hard phase are impregnated therewith. The suspension polymerization is then carried to completion.

Japanese patent publication No. 78-138496 (Chem. Abstr. 90, 122484q) also relates to transparent, impact resistant polymethyl methacrylate resins. First the hard phase is produced by polymerization in water at 80° C. using a redox catalyst system consisting of a chain transfer agent, a persulfate, and a reducing sulfoxy compound in the absence of an emulsifier. A monomer mixture formed of 50 to 90 weight percent of alkyl acrylate, 3 to 40 weight percent of methyl methacrylate, 0 to 40 weight percent of further unsaturated comonomers, 0.1 to 5 weight percent of allyl or methallyl and crotyl esters of unsaturated carboxylic and dicarboxylic acids, and 0 to 5 weight percent polyfunctional crosslinking agents is then added to the emulsion and the mixture so obtained is polymerized in the absence of an emulsifier.

Japanese patent publication No. 78-36589 (Chem. Abstr. 89, 111232) discloses impact resistant materials obtained by the polymerization of methyl methacrylate, optionally together with other monomers, in an aqueous suspension in the presence of a chain transfer agent, followed by the addition of 5 to 40 percent, by weight of the resin, of monomers which form a latexlike polymer, 0.01 to 2 mole percent of polyfunctional monomers, and 0.05 to 10 mole percent of an oil soluble peroxide and polymerization of this mixture.

Earlier work has been directed to the polymerization of monomers in a crosslinked hard phase.

From German Pat. No. 968,083, for example, a process is known for the enlargement of polymeric bodies wherein a solid, lightly crosslinked polymer of at least one monomeric vinyl compound is swollen by contact with at least one polymerizable liquid vinyl compound which is capable of being absorbed by the polymer and in which the polymer is insoluble. The swollen polymer is immersed in an inert liquid which will not dissolve the polymer or the monomer with which the polymer is swollen. The monomer present in the swollen polymer is then polymerized while the body is immersed in a nonsolvent liquid. In this process, the starting material, thus, comprises isolated solid particles which are swollen by absorption of the monomers, these particles then being separated and polymerized in suspension.

Belgian Pat. No. 566,994 also uses particles of thermoplastic materials as starting materials, which particles are caused to absorb appropriate organic solvents such as hydrocarbons, ketones, or ethers.

However, all of these prior art processes have not proved fully satisfactory. The nature of the bonding between the hard phase and the rubbery phase is of special importance. The prior art grafting reactions, which occur more or less at random, afford no opportunity to exert control over the bonding of the hard phase and the rubbery phase. Therefore there is also little chance directly to control the various polymer properties, which are partly defined by the bonding of the hard and rubbery phases.

Moreover, there is nothing in the prior art to indicate how the divergent polymerization of monomers with different refractive indices might be prevented in these processes.

It has been found that the method of the present invention makes it possible to produce impact resistant molding compositions with very good properties and substantially to solve the attendant problems.

The method of the present invention is a bulk (mass) polymerization or a bead (suspension) polymerization in an aqueous medium which comprises, in a first stage, the polymerization of a hard phase (A) having a glass transition temperature above 25° C. and consisting of 70 to 100 weight percent of methyl methacrylate, 0 to 30 weight percent of an acrylic ester of a $C_1$ to $C_8$ alcohol or of a methacrylic ester of a $C_2$ to $C_8$ alcohol, and 0 to 10 weight percent of one or more other vinyl monomers which are copolymerizable with said esters, and, in a second stage, the addition of the monomers of the rubbery phase (B), the polymers of which (considered independently of the existence of the hard phase) have a glass transition temperature below 25° C., and preferably below 10° C. Polymerization of the hard phase (A) in the first stage is carried out in the presence of (a) an oil soluble free radical initiator and of (b) an organosulfur chain transfer agent with at least two thiol groups in the molecule. Polymerization of the rubbery phase (B) is carried out in the presence of the hard phase (A) by swelling the previously formed hard phase (A) with the monomers. Polymerization of the monomers of the rubbery phase thus takes place substantially within the preformed hard phase. Polymerization is advantageously carried out using the residual initiator still present in the hard phase.

The glass transition temperatures ($T_g$) of polymers can be found, for example, in Brandrup and E. H. Immergut, "Polymer Handbook", pages III-61 to III-63, Interscience, 1966; in "Kunststoff-Handbuch", Vol. IX, R. Vieweg and F. Esser, Editors, pp. 333–339, Carl Hanser Verlag, Munich, 1975; or in T. G. Fox, Bull. Am. Physics Soc., Vol. I (3), page 123 (1956).

The glass transition temperature of the hard phase (A) polymerized in the first stage (considered independently of the tough phase) usually is above 25° C., and preferably is 60° C. or higher.

These values are obtained by the use of 70 to 100 weight percent of methyl methacrylate, with which 0 to 30 weight percent of an acrylic ester of a $C_1$ to $C_8$ alcohol, or of a methacrylic ester of a $C_2$ to $C_8$ alcohol, may be copolymerized.

Examples of suitable alkyl esters of acrylic acid are methyl acrylate, ethyl acrylate, propyl acrylate, isopropyl acrylate, butyl acrylate, and particularly n-butyl and isobutyl acrylate, n-hexyl acrylate and 2-ethylhexyl acrylate, as well as neopentyl acrylate.

Examples of suitable alkyl esters of methacrylic acid with $C_2$ to $C_8$ alcohols are ethyl methacrylate, n-propyl methacrylate, butyl methacrylate, and particularly n-butyl methacrylate.

These esters may also be used in the form of mixtures.

Examples of other vinyl monomers which are copolymerizable in amounts from 0 to 10 weight percent with said esters are aromatic vinyl compounds, for example styrene and its derivatives such as alpha-methylstyrene and para-methylstyrene, as well as vinyl esters of aromatic or aliphatic carboxylic acids such as vinyl acetate and vinyl benzoate, as well as acrylonitrile and methacrylonitrile.

The monomers of the rubbery phase (B) are defined as those which, in the form of homopolymers or copolymers (independently of the hard phase), have a glass transition temperature below 25° C., and preferably below 10° C. Suitable esters of methacrylic acid are the esters of $C_2$ to $C_8$ alcohols named above and suitable esters of methacrylic acid are those of $C_1$ to $C_8$ alcohols.

Organosulfur chain transfer agents (molecular weight regulators) having at least two thiol groups in the molecule generally have at least 2, and preferably at least 6, but usually not more than 40, carbon atoms in the molecule. The presence of one or, preferably, more alpha-mercapto carboxylic ester groups in the molecule, preferably derived from polyols such as glycol, propanediol, glycerol, pentaerythritol, and the like is of advantage. Illustrative of these are pentaerythritol tetrathioglycolate, pentaerythritol tetramercaptopropionate, glycol dimercaptoacetate, glycol dimercaptopropionate, glycerine trithioglycolate, trimethylolpropane trithioglycolate, and trimethylolethane triethioglycolate. The esters formed between polyhydroxy alcohols and mercapto-substituted acids such as thioacetic and thiopropionic acids are especially preferred. Suitable alkanedithiols which can be used are, for example, 1,2-ethanedithiol, 1,3-propanedithiol, 1,4-butanedithiol, 1,5-pentanedithiol, 1,6-hexanedithiol, 1,8-octanedithiol, 1,9-nonanedithiol, and 1,10-decanediethiol. Further, bis-2-mercaptoethyl sulfide should be mentioned (cf. N. Kharasch, *Organic Sulfur Compounds*, Vol. 1, pp. 199–209, Pergamon Press, New York, 1961).

Organosulfur chain transfer agents having at least two thiol groups in the molecule may be represented in part by the formula $$HS-CH_2-A-CH_2-SH, \qquad (I)$$

wherein A is a hydrocarbon chain having from 3 to 16 carbon atoms in which one or more carbon atoms can be replaced by —S—, and more particularly such a hydrocarbon chain having from 4 to 8 carbon atoms, or A is $$-(CH_2)_n-\overset{O}{\underset{\|}{C}}-O-Y-O-\overset{O}{\underset{\|}{C}}-(CH_2)_n-,$$

wherein n is 0 or an integer from 1 to 8, and more particularly 0 or 1 to 5, and Y is a hydrocarbon chain having from 2 to 16 carbon atoms which may be substituted with $$HS-CH_2(CH_2)_{n'}-\overset{O}{\underset{\|}{C}}-O(CH_2)_m-,$$

wherein n' has the same meaning as n, and m is 0 or an integer from 1 to 8.

The content of organosulfur molecular weight regulators in the polymerization of the hard phase (A) in the first stage generally ranges from 0.05 to 5 percent, and preferably from 0.1 to 2 percent, by weight of the hard phase (A).

Suitable oil soluble (and water insoluble) free radical initiators (a) are, for example, peroxidic and azo compounds of that type (cf. U.S. Pat. No. 2,471,959). These include organic peroxides such as dibenzoyl peroxide or dilauroyl peroxide and peresters such as tert-butyl-peroxy-2-ethylhexanoate, as well as azo compounds such as azoisobutyronitrile and other known initiators of this type. Free radical forming initiators having higher decomposition temperatures may additionally be used, for example if the temperature is raised toward the end of the reaction to obtain as nearly complete polymerization as possible. The amount of the oil soluble free radical initiators generally ranges from 0.01 to 5 percent, and preferably from 0.2 to 3 percent, and still more preferably is $1.5 \pm 1$ percent, by weight of the monomers of the hard phase (A).

The graft crosslinkers which are used in stage (B) in accordance with the invention are either monomers with at least two different polymerizable groups having different reactivities in the molecule, or monomers having at least three similar polymerizable groups in the molecule, but which groups similarly have different reactivities. In the latter case, the different reactivities of the polymerizable groups, which are otherwise the same in structure, is probably attributable to steric hindrance of those polymerizable groups in each molecule which are unpolymerized as the polymerization proceeds.

Both types of graft crosslinker, that is monomers with at least two polymerizable groups but different reactivities in the molecule and monomers with at least three similar polymerizable groups in the molecule, will improve the clarity of the impact resistant molding compositions. It may be assumed that these graft crosslinkers aid in preventing the divergent polymerization of the monomers having different refractive indices. Moreover, both types of graft crosslinker improve thermoplastic processability (e.g the extrudability) of the material in comparison with other crosslinking agents such as butanediol dimethylacrylate.

In particular, the graft crosslinkers having at least two polymerizable entities having different reactivities may be represented by the general formula

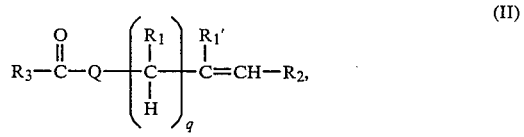

(II)

wherein

Q is —O— or —NR$_5$, where R$_5$ is hydrogen or C$_1$-C$_6$ alkyl,

R$_1$, R$_1'$, R$_1''$, R$_2$ and R$_2'$ are, independently of each other, hydrogen or methyl, R$_3$ is

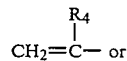

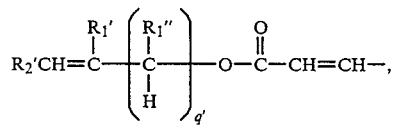

R$_4$ is hydrogen or methyl, and
q and q' are zero or one.

Examples are the allyl, methallyl, and crotyl esters of α,β-unsaturated carboxylic acids, such as allyl metnacrylate and allyl acrylate, and the corresponding methallyl, crotyl, and vinyl esters. An example of a graft crosslinker having three similar polymerizable units in the molecule is trimethylolpropane triacrylate. Other examples of graft crosslinkers are trimethylolpropane trimethacrylate, glycerine trimethacrylate and triacrylate, vinyl methacrylate and vinyl acrylate, vinyloxyethylmethacrylate, N-allylmethacrylamide, and N-allylacrylamide.

The refractive indices of the hard phase (A) and of the rubbery phase (B) may match or differ depending on the monomers selected. For the production of crystal clear products, the polymers of the hard phase (A) and of the rubbery phase (B) should have at least about the same refractive index. To match the refractive index of the rubbery phase to that of the hard phase, copolymerizable monomers making different contributions to the refractive index may be conventionally incorporated in the polymers, for example monomers with fairly high optical density, suitably aromatic monomers, and particularly monomers having a phenyl group therein such as styrene and its derivatives and homologs like alpha-methylstyrene and para-methylstyrene. Their amount will generally range from 10 to 30 percent, by weight of the monomers of the rubbery phase.

The good mechanical properties of the impact resistant molding compositions of the invention depend primarily on the use in the hard phase (A) of an organosulfur molecular weight regulator having at least two thiol groups in the molecule. The nature of the crosslinker used in the rubbery phase (B), on the other hand, has a very marked effect on the optical properties and processing characteristics of the material. For example, when a graft crosslinker having at least two polymerizable entities of different reactivity in the molecule, or when crosslinkers having at least three similar polymerizable groups in the molecule, are used, the products will be decidedly clearer than are products obtained by the use of other crosslinking agents. Also, such molding compositions will be much more readily extrudable than molding compositions produced by the use of other crosslinking agents.

The method for the invention may be carried out along the lines of the known bead (suspension) or bulk polymerization processes, bead polymerization being the preferred mode of operation. In bead polymerization, the ratio of the aqueous phase to the monomer phase usually ranges from 1.5:1 to 4:1.

In performing the bead polymerization, the commonly used dispersing agents should be employed, generally in amounts not exceeding a few weight percent based on the aqueous phase.

Suitable dispersants include water insoluble salts of inorganic acids, such as barium sulfate or barium carbonate, water insoluble oxides such as aluminum hydroxide, or high molecular weight natural substances or synthetic polymers. The group of high molecular weight dispersants includes water soluble colloids such as polyvinyl alcohol, partially saponified polyvinyl acetate, methyl cellulose, starch, gelatin, pectin, the alkali metal salts of polyacrylic acid, or the alkali metal salts of styrene or vinyl acetate/maleic anhydride copolymers, etc. A guide value for the amount of dispersant to be used is 1 weight percent, for example, based on the monomers used.

As a rule, the bead polymerization will be carried out at a temperature ranging from 50° to 95° C. The polymerization time is dependent in large measure on the other process parameters but usually ranges from 2 to 10 hours.

The feature that polymerization of the monomers of the rubbery phase (B) is carried out by the use of graft crosslinkers *within* the previously formed hard phase (A) is of decisive importance with regard to the quality of the products obtained by the process of the invention. Bead polymerization therefore lends itself particularly well to this two stage polymerization process since in bead polymerization the hard phase (A) polymerized first can readily be swollen with the monomers of the rubbery phase (B). It can be highly advantageous if the previously polymerized hard phase (A) still contains sufficient initiator when the monomers of the rubbery phase (B) are added to permit the latter to be polymerized with the aid of the initiator still present in the hard phase (A). If it should prove necessary to add initiator to the monomers of the rubbery phase, then such initiator will primarily be used in the final polymerization. When the dispersing agents used in bead polymerization permit the hard phase (A) to be readily swollen with the monomers of the rubbery phase (B), there appear to be no limitations. Particularly preferred are the so called organic dispersants, for example partially saponified polyvinyl acetate, alkali metal salts of sytrene or vinyl acetate/maleic acid copolymers, and other polymers having hydrophobic and hydrophilic groups in the same molecule.

To minimize the formation of emulsion polymer, a salt, for example common salt, may be added to the aqueous phase. And to improve the stability of the bead suspension, low molecular weight emulsifiers such as the sodium salts of alkanesulfonic acids may also concurrently be used.

The size of the bead polymers may vary from a few microns to several millimeters. As a rule, however, the bead size will be held within a range of about 20 microns to about 2 mm. This assures (1) a large surface area that will permit the hard phase (A) polymerized first to be rapidly swollen with the monomers of the rubbery phase (B) and (2) a bead size that will permit the beads to be readily separated from the aqueous phase.

The bead polymerization of the hard phase (A) and that of the monomers (B) will usually be performed sequentially in the same polymerization vessel. However, the two polymerization stages can also be carried out sequentially in two different polymerization vessels.

The monomers of the hard phase (A) will generally have been polymerized to the extent of at least 80 weight percent by the time the monomers of the rubbery phase (B) are added. It is highly advantageous to add the monomers of the rubbery phase only after the gel-effect has set in in phase (A). The addition of the monomers of the rubbery phase (B) thus takes place at a time when the maximum rate of polymerization of the hard phase has passed. (With regard to the gel-effect, see H. Rauch-Puntigam and Th. Völker in "Acryl- und Methacrylverbindungen", Springer-Verlag, 1967.)

While two stage bead (suspension) polymerization is the preferred embodiment of the process of the invention for the production of impact resistant molding compositions, polymerization may also be carried out by first producing the hard phase by bulk (mass) polymerization and then, after the hard phase (A) has been comminuted to increase the surface area (unless it was actually produced in a high surface form, such as a polymer string), swelling it with the monomers of the rubbery phase (B) and polymerizing the latter monomers in the presence of the hard phase (A).

Two stage bulk polymerization lends itself particularly well to continuous polymerization.

The process may also be carried out by first polymerizing the hard phase (A) by the bead polymerization technique and then performing the polymerization of the monomers of the rubbery phase (B) within the hard phase (A) as a bulk polymerization.

Generally speaking, two stage bead polymerization is the preferred mode of operation. However, any other process in which the polymer is obtained directly in the form of readily isolated particles having a weight of at least $10^{-9}$ g/particle and wherein the preformed hard phase (A) can readily be swollen with the monomers of the rubbery phase (B) should be suitable.

Emulsion polymerization, in which the polymer particles usually have a weight of less than $10^{-12}$ g/particle, thus must be ruled out since, following the actual polymerization process, that method requires the performance of costly operations for isolation of the solid polymer, for example chemical precipitation, spray drying, etc.

The weight ratio of the monomers of the hard phase (A) to the monomers of the rubbery phase (B) should range from 1:0.15 to 1:3 and preferably from 1:0.25 to 1:1.5.

As a rule, it is advantageous to produce as large an amount of the rubbery phase (B) as is possible in the two stage polymer and then to mix the polymer with a thermoplastically processable molding composition in such measure that the latter has the desired content of rubbery phase.

The thermoplastically processable molding composition used in such mixing is advantageously composed of polymethyl methacrylate. Mixing is advantageously done under high shear stresses, for example by means of a kneading extruder or of a co-kneader.

Subjecting the impact resistant two stage polymer to preliminary shearing action offers processing advantages even when the two stage polymer is to be processed as is, without being mixed with another molding composition.

Additives such as solvents, plasticizers (e.g. dioctyl phthalate), or lubricants (e.g. cetyl alcohol or paraffin) may be used both in the production of the two stage polymer according to the invention and in mixing it with other molding compositions. Other low molecular weight substances such as anti-aging agents, dyes, etc. may also be added.

The examples which follow will serve to illustrate the process of the invention.

As will be shown in three comparison examples in which the organosulfur chain transfer agent (B) of the invention having at least two thiol groups in the molecule is not used, the presence of this component is of great importance to the mechanical properties of the impact resistant molding compositions. Good optical properties of the impact resistant molded articles and good processability of the molding composition further require the use of a graft crosslinker in the monomer mixture (B).

The following standard techniques for determining key mechanical properties are used:

| | |
|---|---|
| Vicat softening temperature | (DIN 53460) |

| -continued | |
|---|---|
| Impact strength | (DIN 53453) |
| Tensile impact strength | (DIN 53448) |
| Notched-bar impact strength | (DIN 53448) |
| Elongation at rupture | (DIN 53455) |

In the bead polymerization recipes, an 0.4% dispersant solution, for example aluminum hydroxide prepared in situ from aluminum sulfate and soda, was used. Moreover, polyvinyl alcohol was used in the presence of 0.05 weight percent of the sodium salt of a $C_{14}$ to $C_{16}$ alkanesulfonic acid.

EXAMPLE 1

1000 ml of a dispersant solution containing 0.4% dispersant are charged into a polymerization vessel equipped with stirrer, reflux condenser, and internal thermometer.

A monomer/initiator/modifier mixture (A), prepared from
  427 g of methyl methacrylate,
  3 g of pentaerythritol tetrathioglycolate, and
  6 g of dilauryl peroxide,
is added to this aqueous solution at 70° C. with vigorous stirring. The resulting mixture is stirred for 100 minutes at 70° C., following which a monomer mixture (B), prepared from
  210 g of butyl acrylate,
  45.5 g of styrene,
  17.5 g of methyl methacrylate, and
  3.5 g of allyl methacrylate
is added. Stirring is continued for another 2 hours at 70° C. The temperature in the reaction vessel is then increased to 90° C. for 1 hour to complete the polymerization. This is followed by cooling (if aluminum hydroxide was used as dispersant, it is dissolved with sulfuric acid), filtration by suction, washing with distilled water, and drying. The bead polymer so obtained is then granulated. It can be used as is or admixed with further polymer (for example, polymethyl methacrylate prepared by some other method) to produce impact resistant molded articles by injection molding, extrusion, or another technique.

For the mechanical and optical properties of a molding composition produced by mixing two parts of the polymer according to Example 1 with one part of thermoplastically processable polymethyl methacrylate, see Table 1.)

An alkanethiol such as 1,6-hexanedithiol can be employed as a chain transfer agent in the method of this Example, instead of pentaerythritol tetrathioglycolate.

EXAMPLE 2

The same bead polymerization recipe is used as in Example 1. However, a trifunctional crosslinker is used in the monomer mixture (B).
  Composition of monomer mixture (A):
  427 g of methyl methacrylate,
  3 g of pentaerythritol tetrathioglycolate, and
  6 g of dilauroyl peroxide.
  Composition of monomer mixture (B):
  210 g of butyl acrylate,
  45.5 g of styrene,
  17.5 g of methyl methacrylate, and
  3.5 g of trimethylolpropane triacrylate.

The batch is worked up as described in Example 1. (For the mechanical and optical properties of a mixture with polymethyl methacrylate, see Table 1.)

EXAMPLE 3

The same procedure is followed as in Example 1 except that a different graft crosslinker is used in the monomer mixture (B).
  Composition of monomer/initiator/modifier mixture (A):
  427 g of methyl methacrylate,
  3 g of pentaerythritol tetrathioglycolate, and
  6 g of dilauroyl peroxide.
  Composition of monomer mixture (B):
  210 g of butyl acrylate,
  45.5 g of styrene,
  17.5 g of methyl methacrylate, and
  5 g of vinyl methacrylate.

The batch is worked up as described in Example 1. (For the mechanical and optical properties of a mixture with polymethyl methacrylate, see Table 1.)

EXAMPLE 4

(Comparison Example)

The same procedure is followed as in Example 3 except that a MW having only one thiol group in the molecule is used in place of the tetrafunctional organosulfur chain transfer agent.
  Composition of monomer/initiator/modifier mixture (A):
  427 g of methyl methacrylate,
  1.5 g of 2-ethylhexyl thioglycolate, and
  6 g of dilauroyl peroxide.
  Composition of monomer mixture (B):
  210 g of butyl acrylate,
  45.5 g of styrene,
  17.5 g of methyl methacrylate, and
  5 g of vinyl methacrylate.

A polymer is obtained which does yield clear molded articles. However, the mechanical properties of such articles are quite inferior compared to Example 3. (See also Table 1.)

EXAMPLE 5

(Comparison Example)

The same procedure is followed as in Example 1 except that a regulator having only one thiol group in the molecule is used in place of tetrafunctional chain transfer agent.
  Composition of monomer/initiator/modifier mixture (A):
  427 g of methyl methacrylate,
  1.5 g of 2-ethylhexyl thioglycolate, and
  6 g of dilauroyl peroxide.
  Composition of monomer mixture (B):
  210 g of butyl acrylate,
  45.5 g of styrene,
  17.5 g of methyl methacrylate, and
  3.5 g of allyl methacrylate.

A polymer is obtained which does yield clear molded articles. However, the mechanical properties of such articles are quite inferior compared with articles made with the polymer of Example 1. In contrast to the molding composition of Example 1, the material of Example 5 is not extrudable.

EXAMPLE 6

(Comparison Example)

The same procedure is followed as in Example 1 except that no graft crosslinker is used in monomer mixture (B).

Composition of monomer (B):
210 g of butyl acrylate,
45.5 g of styrene,
17.5 g of methyl methacrylate, and
3.5 g of butanediol dimethacrylate.

With this material a molding composition is obtained which has good mechanical properties but is opaque. The composition is not nearly as readily extrudable as the molding composition made with the polymer of Example 1.

EXAMPLE 7

(Comparison Example)

The same procedure is followed as in Example 1 except that no polyfunctional organosulfur chain transfer agent is used in phase (A) and no graft crosslinker is used in phase (B).

Composition of monomer/initiator/modifier mixture (A):
427 g of methyl methacrylate,
1.5 g of 2-ethylhexyl thioglycolate, and
6 g of dilauroyl peroxide.

Composition of monomer mixture (B):
210 g of butyl acrylate,
45.5 g of styrene,
17.5 g of methyl methacrylate, and
3.5 g of butanediol dimethacrylate.

A material is obtained which when used in molding compositions for injection molding results in opaque articles with poor mechanical properties. The composition is not extrudable. See also Table 1.

| Vicat softening temperature: | 80° C. |
| Notched bar impact strength: | 7–8 kJ/m$^2$ |
| Impact strength: | No fracture |
| Tensile impact strength: | 1.5 J/mm$^2$ |
| Elongation at rupture: | 60% |

Optical evaluation: Colorless, shiny platelets. Light transmittance: Better than 90%.

EXAMPLE (9)

The same procedure is followed as in Example 1, but a different weight ratio of hard phase (A) to rubbery phase (B) is selected.

Composition of monomer/initiator/modifier mixture (A):
3 g of methyl methacrylate,
5 g of dilauroyl peroxide, and
2.2 g of pentaerythritol tetrathioglycolate.

Addition of monomer phase (B) after polymerization for 120 minutes at 70° C.

Monomer phase (B):
210 g of butyl acrylate,
42.5 g of styrene,
17.5 g of methyl methacrylate, and
4.2 g of allyl methacrylate.

The beads were worked up as described in Example 1. Mixing them with a thermoplastically processable polymethyl methacrylate in a ratio of 1:1 results in a molding composition which can be injection molded or extruded to give clear, impact resistant articles.

| Vicat softening temperature: | 95° C. |
| Notched-bar impact strength: | 3.3 kJ/m$^2$ |
| Impact strength: | 50 kJ/mm$^2$ |

TABLE 1

Characterization of molding compositions produced by mixing the bead polymers of Examples 1 to 7 with a thermoplastically processable polymethyl methacrylate in a ratio of 2:1

| Bead polymer of Example | Modifier in hard phase (A) (Wt. %) | Crosslinker in rubbery phase (B) (Wt. %) | VST (°C.) | IS (kJ/M$^2$) | TIS (J/mm$^2$) | Optical evaluation |
|---|---|---|---|---|---|---|
| 1 | 0.70 Tetra SH | 1.3 AM | 95 | 87 | 0.90 | Colorless, clear |
| 2 | 0.70 Tetra SH | 1.3 TPTA | 96 | 58 | 0.64 | " |
| 3 | 0.70 Tetra SH | 1.8 VM | 98 | 65 | 0.50 | " |
| 4 | 0.35 Mono SH | 1.8 VM | 97 | 40 | 0.19 | " |
| 5 | 0.35 Mono SH | 1.3 AM | 93 | 46 | n/e | " |
| 6 | 0.70 Tetra SH | 1.3 BDDM | 93 | 86 | 0.86 | Colorless opaque |
| 7 | 0.35 Mono SH | 1.3 BDDM | 92 | 37 | n/e | " |

Key to abbreviations:
Tetra SH = Pentaerythritol tetrathioglycolate
Mono SH = 2-Ethylhexyl thioglycolate
VST = Vicat softening temperature (DIN 53460)
IS = Impact strength (DIN 53453)
TIS = Tensile impact strength (DIN 53448)
SE = Strand expansion
AM = Allyl methacrylate
TPTA = Trimethylolpropane triacrylate
VM = Vinyl methacrylate
BDDM = Butanediol dimethacrylate
n/e = nonextrudable

EXAMPLE 8

The bead polymer of Example 1 is granulated in a kneading extruder. A molding composition is so obtained which can be injection molded or extruded to give crystal clear impact resistant articles.

EXAMPLE 10

This example relates to a two stage process for the production of an impact resistant molding composition wherein the first stage is carried out as a bead polymerization and the second stage as a bulk polymerization.

Polymerization of the hard phase (A) is performed as described in Example 1. However, the recipe is three times as large.

| Quantities of ingredients | 1281 g of methyl methacrylate, |
| of hard phase (A): | 9 g of pentaerythritol tetrathioglycolate, and |
| | 18 g of dilauroyl peroxide. |

Polymerization is carried out with vigorous agitation for 120 minutes at 70° C. This is followed by cooling, washing out the dispersant, and drying at room temperature.

Of the hard phase (A) so obtained as a bead polymer, 711 g is added at room temperature with agitation to a monomer mixture (B), consisting of 600 g of butyl acrylate,
  132 g of styrene,
  45 g of methyl methacrylate,
  18 g of allyl methacrylate, and
  4 g of dilauroyl peroxide.

The batch is gradually heated to 45° C., which produces a highly viscous solution. The latter is used to fill five bags of equal size. These bags are then polymerized, initially for 30 minutes at 55° C., then for 3 hours at 60° C., then for 2 hours at 65° C., then for 3 hours at 70° C., and finally for 5 hours at 90° C. The samples are then cooled and comminuted.

The comminuted polymer is then mixed in a ratio of 1:1 with a thermoplastically processable polymethyl methacrylate and extruded. The extrudate is used to injection mold test pieces.

| Vicat softening temperature: | 101° C. |
| Impact strength: | 61 kJ/m$^2$ |
| Notched-bar impact strength: | 3.2 kJ/m$^2$ |
| Tensile impact strength: | 0.53 J/mm$^2$ |
| Optical properties: | Colorless, clear, shiny |

What is claimed is:

1. A method for making an impact resistant molding composition, which method comprises polymerizing, in a first stage, a monomer mixture comprising from 70 to 100 percent by weight of methyl methacrylate, 0 to 30 percent by weight of an ester formed between acrylic acid and an aliphatic alcohol having from 1 to 8 carbon atoms and/or an ester formed between methacrylic acid with an alcohol having from 2 to 8 carbon atoms, and from 0 to 10 percent by weight of at least one further different vinyl monomer copolymerizable with the aforementioned comonomers, to form a hard phase polymer having a glass transition temperature above 25° C., the polymerization in said first stage being carried out in the presence of an oil soluble free radical initiator and of an organosulfur chain transfer agent having at least two thiol groups per molecule, and then in a second stage adding, to said hard phase polymer, monomers forming a rubbery phase and further polymerizing the mixture of monomers and polymer to completion in the presence of a graft crosslinking agent, the monomers of said rubbery phase being monomers the homopolymers of which have a glass transition temperature below 25° C.

2. A method as in claim 1 wherein the polymerization of said first stage is performed in an aqueous medium as a bead polymerization.

3. A method as in claim 1 wherein the polymerizations of said first and second stages are both carried out as bead polymerizations.

4. A method as in claim 1 wherein the monomers of the rubbery phase are polymerized by a bead polymerization process within the hard phase polymer prepared in the first stage.

5. A method as in claim 1 wherein the monomers of the rubbery phase are polymerized in the second stage after dissolving the polymer of the hard phase in said monomers.

6. A method as in claim 1 wherein said organosulfur chain transfer agent has from 2 to 40 carbon atoms.

7. A method as in claim 1 wherein said organosulfur chain transfer agent has the formula

HS—CH$_2$—A—CH$_2$—SH, wherein A is a hydrocarbon chain having from 3 to 16 carbon atoms in which one or more carbon atoms can be replaced by —S—, or is

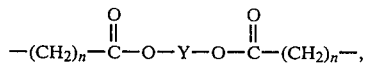

wherein n is 0 or an integer from 1 to 8 and Y is a hydrocarbon chain having from 2 to 16 carbon atoms or is such a chain which is substituted by

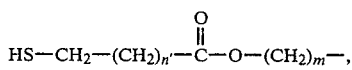

wherein n' has the same meaning as n, and m is 0 or an integer from 1 to 8.

8. A method as in claim 1 wherein said organosulfur chain transfer agent is pentaerythritol tetrathioglycolate.

9. A method as in claim 1 wherein said organosulfur chain transfer agent is present in an amount from 0.05 to 5 percent by weight of the hard polymer.

10. A method as in claim 1 wherein said graft crosslinker is a monomer having at least two polymerizable groups of different reactivity per molecule.

11. A method as in claim 1 characterized in that said graft crosslinker is an allyl, methallyl, crotyl, or vinyl ester of an α,β-unsaturated monocarboxylic acid or dicarboxylic acid.

12. A method as in claim 12 wherein said graft crosslinker is an allyl, methallyl, crotyl, or vinyl ester of acrylic acid or of methacrylic acid.

13. A method as in claim 1 wherein said graft crosslinker is a monomer having at least three similar polymerizable groups.

14. A process as in claim 1 wherein said graft crosslinker contains at least three acrylic and/or methacrylic groups.

15. A method as in claim 1 wherein the amount of oil soluble free radical initiator employed is from 0.01 to 5 percent by weight of the monomers of the hard phase polymer.

16. A method as in claim 1 wherein addition of the monomers in said second stage is started at the earliest when the rate of polymerization is decelerating.

17. A method as in claim 1 wherein said monomers of the rubbery phase added in the second stage comprise 100 to 80 percent of at least one ester of acrylic acid with a $C_1$–$C_8$ alcohol and from 0 to 20 percent, by weight of the monomers of the second stage, of at least one ester of acrylic acid with a $C_1$ to $C_{18}$ alcohol.

18. A method as in claim 1 wherein the refractive index of the rubbery phase is matched with the refractive index of the hard polymer phase by the copolymerization, in the rubbery phase, of a suitable amount of a monomer having an optical density greater than the optical density of the aliphate esters of acrylic acid and/or methacrylic acid used therein.

19. A method as in claim 18 wherein said monomer having higher optical density comprises an aromatic group in the molecule.

20. A method as in claim 1 wherein the ratio by weight of monomers in the hard polymer phase to the monomers polymerized in the rubbery phase is from 1:0.15 to 1:3.

21. A method as in claim 1 wherein no further free radical initiator is added for polymerization of the rubbery phase in the second stage.

* * * * *